United States Patent [19]

Cho et al.

[11] Patent Number: 5,051,838
[45] Date of Patent: Sep. 24, 1991

[54] PORTABLE ELECTRONIC COPYING MACHINE

[75] Inventors: Michio Cho; Ko Aosaki; Tokuji Sato, all of Tokyo, Japan

[73] Assignee: Fuji Photo Film Co., Ltd., Kanagawa, Japan

[21] Appl. No.: 370,321

[22] Filed: Jun. 22, 1989

[30] Foreign Application Priority Data

Jun. 22, 1988 [JP] Japan .................................. 63-154023
Jul. 15, 1988 [JP] Japan .................................. 63-93786

[51] Int. Cl.⁵ .............................................. H04N 1/40
[52] U.S. Cl. .................................. 358/401; 358/400; 358/909; 358/300
[58] Field of Search ............... 358/400, 401, 909, 134, 358/345, 300

[56] References Cited

U.S. PATENT DOCUMENTS

| | | | |
|---|---|---|---|
| 4,074,324 | 2/1978 | Barrett | 358/479 |
| 4,262,301 | 4/1981 | Erlichman | 358/134 |
| 4,802,014 | 1/1989 | Koga | 358/471 |
| 4,864,410 | 9/1989 | Andrews et al. | 358/909 |
| 4,939,588 | 7/1990 | Ushiro et al. | 358/401 |

Primary Examiner—Edward L. Coles, Sr.
Attorney, Agent, or Firm—Young & Thompson

[57] ABSTRACT

An electronic copying machine comprises an optical image forming system for forming an optical image of a remote surface on an image plane, and an image sensor disposed in the image plane and transversely movable in the image plane for scanning the optical image and converting the image into image signals. A scanning area defining device defines the height of the image sensor so as to scan the image plane according to the height of the remote surface. An image printing unit including a printing head is driven according to the image signals for printing an image on paper.

11 Claims, 5 Drawing Sheets

PORTABLE ELECTRONIC COPYING MACHINE

BACKGROUND OF THE INVENTION

The present invention relates to an electronic copying machine for making a hard copy of a remote surface such as a writing board.

In recent years, there have been developed electronic copying machines capable of making a hard copy of notes, illustrations or the like written on a writing board itself or on a sheet placed on or tacked to the writing board, which consists of a video camera and a printer assembled as an integral unit. In one such electronic copying machine, an image of a selected part of the remote surface is optically formed on an image sensor, such as a charge coupled device (CCD), of the video camera and converted into video signals. A printing head of the printer is driven by the aid of or according to the video signals to print an image on a copy paper. Such electronic copying machines are often used on a table or desk. Because tables or desks and writing boards are usually different in height, an electronic copying machine on a table is not always capable of forming an image of the whole surface of the writing board.

To make it possible to cover the whole surface of the writing board, it was proposed that the electronic copying machine be placed on a table in such a way as to incline the optical axis of the image-forming optical system upward at a proper angle with respect to the surface of the writing board. This, however, leads to the so-called keystone effect in the copied image. That is, the image of the surface of the writing board formed by the electronic copying machine thus placed on the table has disproportionate vertical magnification relative to horizontal magnification. To eliminate this keystone effect, the electronic copying machine should be displaced vertically so as to dispose the optical axis of the image-forming optical system perpendicular to the surface of the writing board. This leads to a troublesome adjustment of the electronic copying machine on the table with respect to the writing board.

In an attempt at avoiding the need for such a troublesome adjustment, a novel electronic copying machine has been proposed in Japanese Utility Model Appln. No. 62-202,873 now U.S. Pat. No. 4,939,533 filed by the assignee of the present application. The electronic copying machine described in this Japanese utility model application consists of a main housing containing a printing unit and a roll of copy paper on which images are printed, and an image-forming unit having at least an image-forming optical system, such as a taking lens system, and an image sensor enclosed in an image-forming unit housing. The image-forming unit housing is supported by a supporting post or structure mounted on the main housing for pivotal movement. In advance of making a copy of the remote surface such as the surface of a writing board, the supporting post is pivotally raised so as to position the optical axis of the taking lens system perpendicular to the center of an area of the remote surface to be copied.

Because the image-forming unit housing is affected by mechanical vibrations from the printing unit and other moving parts, which vibrations are amplified and transmitted through the raised supporting post, an image produced by the image-forming unit will often be unclear or blurred.

OBJECT OF THE INVENTION

It is, therefore, an object of the present invention to provide an electronic copying machine suitable for making a hard copy of a remote surface of for example a writing board or a paper tacked to a writing board or a wall.

It is another object of the present invention to provide an electronic copying machine in which an image-forming unit is isolated from mechanical vibrations produced by moving parts incorporated in the electronic copying machine.

It is still another object of the present invention to provide an electronic copying machine that allows easy framing of an area of a remote surface to be copied.

It is a further object of the present invention to provide an electronic copying machine which is thin or flat in shape and compact in size.

SUMMARY OF THE INVENTION

In accordance with a preferred embodiment of the present invention, there is provided an electronic copying machine for making a hard copy of a remote surface which has a generally parallelepipedal thin housing. The housing incorporates image-forming means for forming an image of a remote surface and converting the image into video signals, that is so disposed in an upper portion thereof as to have an optical axis extending in a lengthwise direction from the front of the housing to the rear, and a power supply unit including at least a power transformer which is heavy in weight, disposed in a bottom portion thereof. An image printing unit including a printing head is disposed in the housing between the image-forming means and the power supply unit. The printing head is driven by the aid of or according to the video signals and prints an image on paper.

According to another preferred embodiment of the present invention, the electronic copying machine comprises a generally parallelepipedal housing, optical image-forming means disposed in the housing for forming an optical image of a remote surface of an image plane, image sensor means disposed in the image plane and transversely movable in the image plane for scanning the optical image of the remote surface and converting it into video signals, scanning area defining means for defining a vertical length of the image sensor so as to scan the image plane according to the height of the remote surface, and an image printing unit including a printing head driven by the aid of or according to the video signals for printing an image on paper.

The scanning area defining means comprises a finder optical system, visual field defining means disposed in the finder optical system for variably defining the visual field of the finder system according to the height of a remote surface, and field size detecting means for detecting the size of the visual field defined by the visual field defining means and actuating the image sensor according to the detected size of visual field.

BRIEF DESCRIPTION OF THE DRAWINGS

The above and other objects, features and advantages of the present invention will be more fully understood from the following description of preferred embodiments thereof with reference to the accompanying drawings, in which.

DETAILED DESCRIPTION OF THE INVENTION

Figure 1:
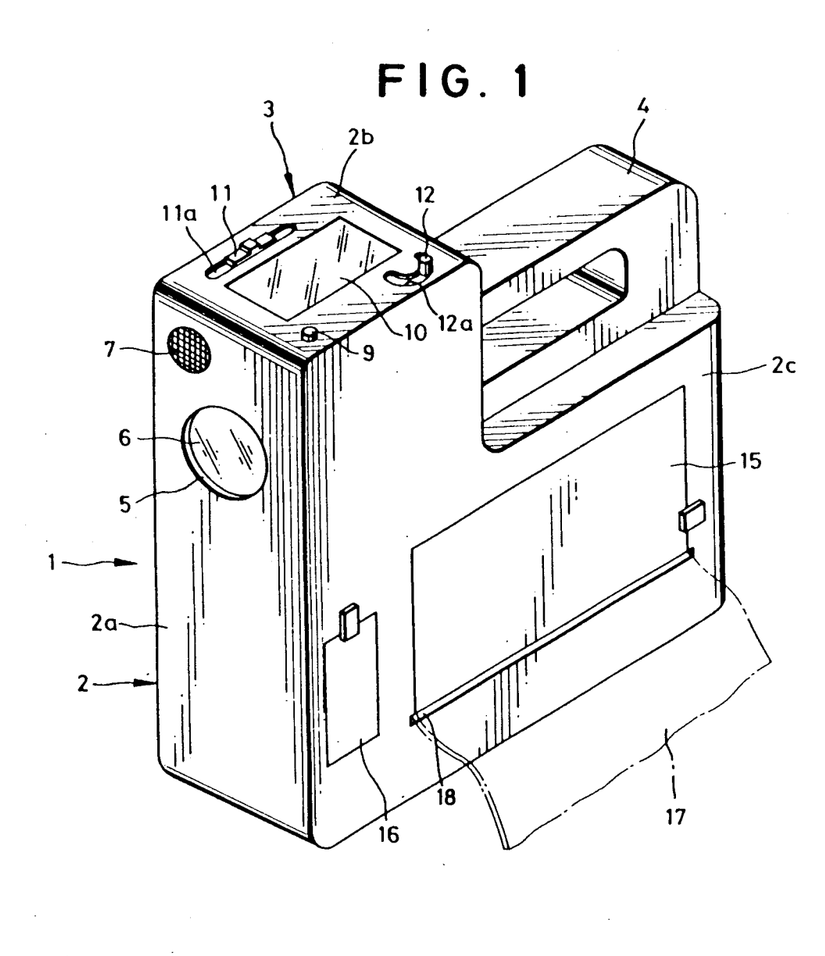
FIG. 1 is a perspective view showing an electronic copying machine according to a preferred embodiment of the present invention.
Figure 2:
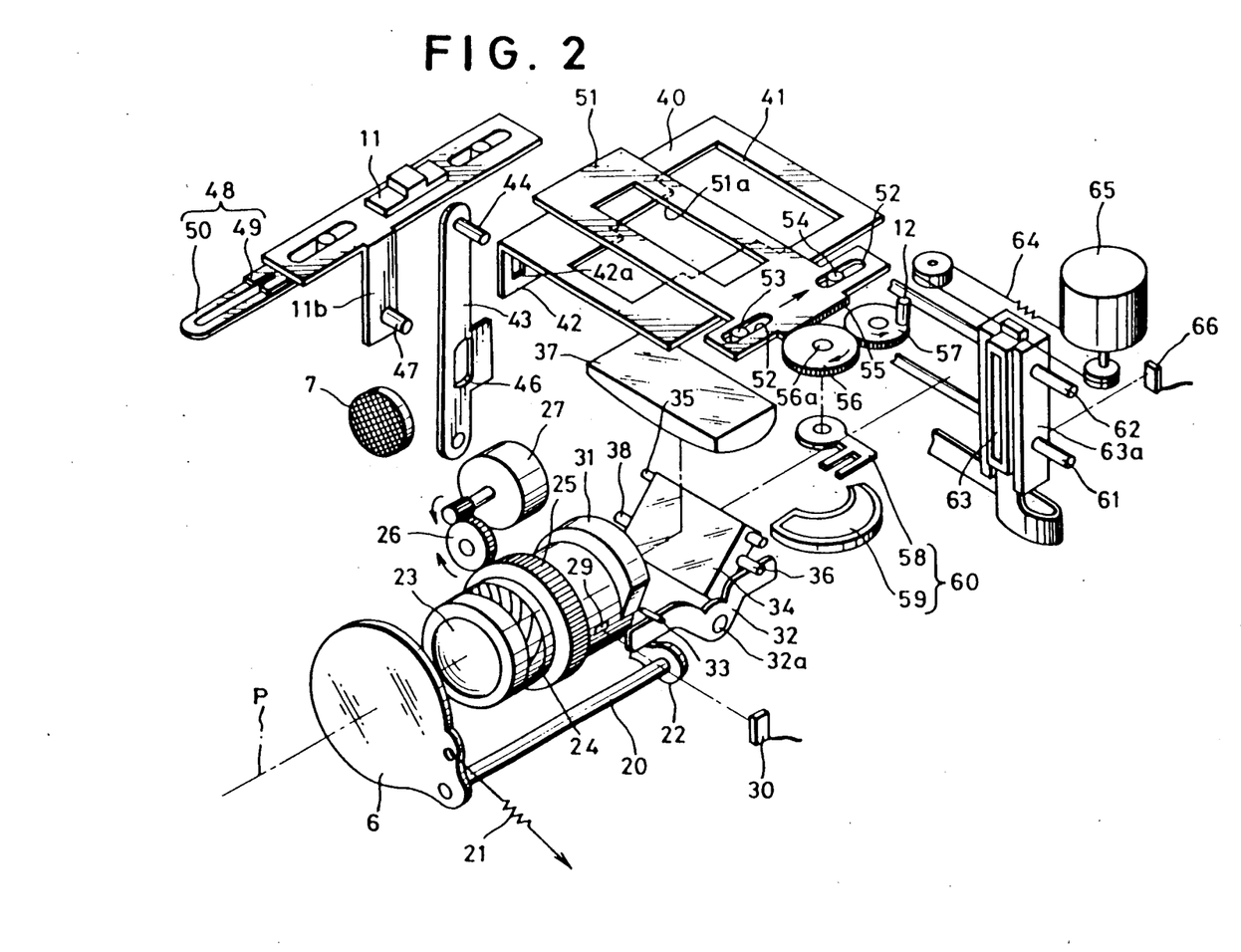
FIG. 2 is an exploded perspective view showing the interior mechanism of the electronic copying machine shown in FIG. 1.

Referring now to FIGS. 1 and 2, an electronic copying machine 1 according to a preferred embodiment of the present invention, suitable for making a hard copy of e.g. a writing board remote therefrom, is shown, consisting of a thin or flat generally parallelepipedal housing 2 with an upper right or rear quarter portion cut away. An upper left or front quarter portion of the housing 2 forms an image-forming housing section 3. An integral handgrip 4 is formed in the cut-away portion for carrying convenience. The housing 2 has an exposure opening 5 defined by a hole formed in an upper portion of the front wall 2a thereof. A transparent lens cover 6, which is made of plastic, is pivotally mounted on the front wall 2a in the housing 2 so as to open and close the exposure opening 5, keeping dust or foreign articles from entering the housing 2 and protecting a taking lens system 23 from being scratched.

An ultrasonic generator 7 of an ultrasonic autofocus device, which is of a well-known type, is provided and is disposed in the housing 2 above the lens cover 6. The ultrasonic autofocus device generates ultrasonic waves and directs them forwardly upward at approximately 10° with respect to the optical axis P of the taking lens 23 and receives the ultrasonic waves reflected by a subject, i.e. the surface of a writing board remote therefrom to measure the distance between the copying machine and the writing board.

The top wall 2b of the housing 2 is provided with a shutter release button 9 and a finder screen 10. The top wall 2b is formed with a straight slot 11a and an arcuate slot 12a on opposite sides of the finder screen 10, which receive a copy width change lever 11 and a copy height adjusting knob 12, respectively, which will be described in detail later.

One side wall 2c of the housing 2 is provided with a paper loading door 15 hinged thereto along its front end and an access door 16 which is smaller in size than the paper loading door 15 and is hinged thereto along its lower side. The paper loading door 15 is opened to load a roll of thermosensitive copy paper 17 as a recording paper in a printer unit located in the housing 2 adjacent to the paper loading door 15. The thermosensitive copy paper 17 can be withdrawn through a paper slot 18 formed in the side wall 2c along the lower side of the paper loading door 15. The access door 16 is opened for access to a control panel with various switches, such as a power switch, a print mode select switch, a density change switch, etc., all of which are well known in the art.

Details of the structure of the electronic copy machine are shown in FIG. 2. The transparent lens cover 6 is fixed to the front end of a rotatable connecting shaft 20 and urged by means of a spring 21 to turn in the clockwise direction. The rotatable connecting shaft 20 has a detent 22 secured to the rear end thereof. A lens barrel 24 holding the taking lens system 23 is supported for rotation in the housing 2 behind the transparent lens cover 6. The lens barrel 24 has an external ring gear 25 integrally formed therewith or fixedly mounted thereon. The lens barrel 24 is operationally coupled to a DC motor 27 through an idler gear 26 in mesh with the external ring gear 25, so that rotation transmitted from the DC motor 27 is imparted to the lens barrel 24. As will be described in detail later, the DC motor 27 is controlled by means of the ultrasonic autofocus device. A photosensor 30, which is laterally spaced from the lens barrel 24, is provided in the housing 2 to detect a light reflective signaling member 29 attached to the outer surface of the lens barrel 24. The photosensor 30 can detect light reflected from the signaling member 29 when the lens barrel 24 is at its initial position shown in FIG. 2.

The lens barrel 24 further has a ring cam 31 integrally formed with or fixedly mounted on the rear end portion thereof. The peripheral cam surface of the ring cam 31 is in slidable contact with a cam follower pin 33 secured to a front upper edge of a mirror drive lever 32 pivotally mounted on a shaft 32a. The front under edge of the mirror drive lever 32 is continuously in engagement with the detent 22 of the rotatable connecting shaft 20 which, as previously noted, is urged in the clockwise direction. The rear end of the mirror drive lever 32 is in engagement with a follower pin 36 laterally projecting from a reflex mirror 34 which is pivotally mounted on a shaft 35. The reflex mirror 34, when placed in the optical path at 45°, reflects and directs light from the taking lens system 23 upward at a right angle. A condenser lens 37 is disposed directly above the reflex mirror 34. To accurately direct light reflected by the reflex mirror 34 toward the condenser lens 37, the reflex mirror 34 is restrictively stopped with a stopper pin 38 so as to be held at 45° with respect to the optical axis P of the taking lens system 23.

Above the condenser lens 37 a black framing mask 40 is slidably mounted for movement in a direction parallel to the optical axis P of the taking lens system 23. The framing mask 40 is formed with an opening 41 of which the inner width varies stepwise according to the widths of standard writing boards, for example 90 cm, 120 cm and 180 cm. The framing mask 40 is integrally formed with a side wall 42 with a slot 42a, wall 42 being bent downward at a right angle. Laterally spaced from the framing mask 40 is a swingable lever 43. A pin 44 secured to an upper end portion of the swingable lever 43 is received in the slot 42a of the side wall 42 of the framing mask 40. The swingable lever 43 has formed therein a longitudinal hole or slot 46 at its middle portion. The longitudinal slot 46 receives a pin 47 projecting laterally inwardly from a bent down portion 11b of the copy width change lever 11. When moving the copy width change lever 11 forward or backward in the direction parallel to the optical axis P, the framing mask 40 is correspondingly slid forward or backward. The copy width change lever 11 is provided with a potentiometer 48 cooperating therewith. The potentiometer 48 consists of a slide contact 49 secured to the under surface of the copy width change lever 11 and a resistance 50 in slidable contact with the slide contact 49.

A transparent framing mask 51 is slidably mounted to slide over the framing mask 40 in a direction parallel to the optical axis P of the taking lens system 23. The framing mask 51 is formed with a rectangular opening 51a having a width equal to the widest portion of the opening 41 of the framing mask 40 which corresponds to the width of the 180 cm standard writing board. The framing mask 51 is further formed with a pair of axial slots 52 extending parallel to the optical axis P and a rack 55 on one side. Fixed guide pins 53 are received one in each of the slots 52 for guiding the axial movement of the framing mask 51. The rack 55 is in mesh with a gear 56 in mesh with a gear 57 on which the vertical copy width adjusting knob 12 is eccentrically mounted. A potentiometer 60, which consists of a slide contact 58 and a resistance segment 59, is provided in cooperation with the gear 56. The slide contact 58 has a forked contact end in slidable contact with the resistance segment 59 which latter is a circular arc. Contact 58 is fixedly mounted on a shaft 56a of the gear 56.

Spaced behind the mirror 34 are a pair of horizontal parallel guide shafts 61 and 62. The guide shafts 61 and 62 slidably support an image-reading means such as a line sensor 63 consisting of a great number of photoconversion elements arranged vertically in a frame 63a. The frame 63a is operationally connected to a stepping motor 65 with a wire 64. When the stepping motor 65 rotates, the line sensor 63 is moved transversely along the guide shafts 61 and 62. The line sensor 63 has, for example in this embodiment, 2048 photoconversion elements arranged vertically. That is, the 1st to 2048th photo-detecting elements are closely arranged from the lower end of the line sensor 63 to the top end. The line sensor 63 at its initial or starting position shown in FIG. 2 from which it moves to the left as viewed in FIG. 2, is detected by way of a reflective type photosensor 66 located behind the line sensor 63.

Figure 3:
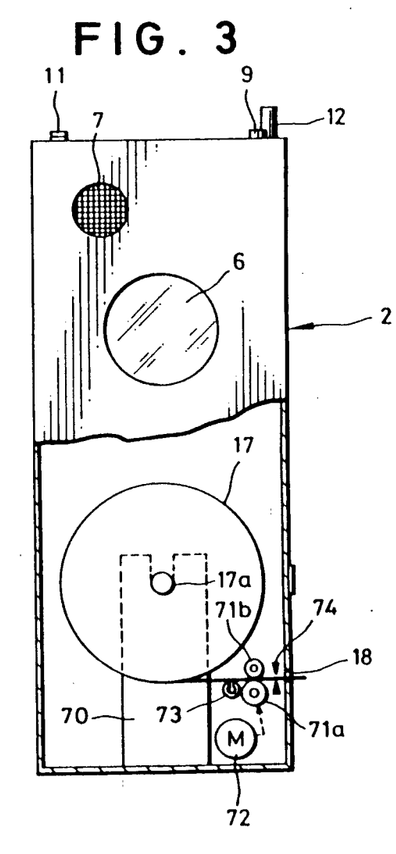
FIG. 3 is a front view, partially cut away, of FIG. 1.

Referring to FIG. 3, the printing unit located in the housing 2 adjacent to the paper loading door 15 is shown, having a stand 70 rotatably supporting a core rod 17a on which the thermosensitive copy paper 17 is wound in a roll. The thermosensitive copy paper 17 is withdrawn and directed toward the paper slot 18 by a drive roller 71a driven by a stepping motor 72 and a pinch roller 71b. A thermal printing head 73 is so located between the stand 70 and the drive roller 71a as to contact the under surface of the thermosensitive copy paper 17. A cutter 78 is disposed beyond the rollers 71a and 71b to cut off a printed part of the thermosensitive copy paper 17 and deliver it through slot 18 out of the housing 2.

Figure 4:
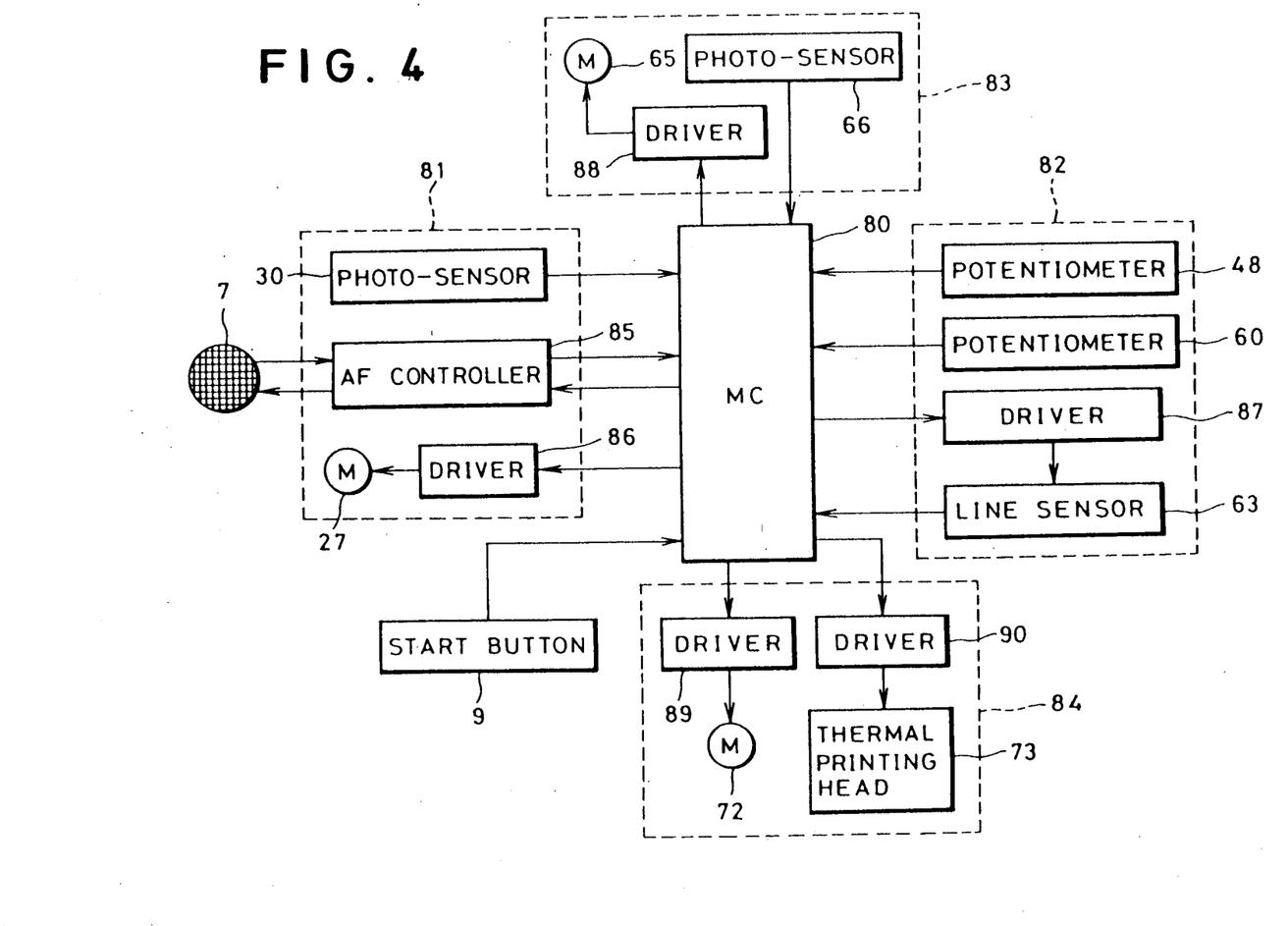
FIG. 4 is a block diagram showing the control circuitry incorporated in the electronic copying machine shown in FIG. 1.

The functional structure of the electronic copying machine 1 depicted in FIGS. 1 to 3 will be best understood from FIG. 4, which diagrammatically illustrates the functional elements. A microcomputer (which will be hereinafter referred to simply as an MC) 80 controls the operation of the various units, such as an autofocus control unit (which will be hereinafter referred to simply as the AF unit) 81, an image sensor control unit 82, an image sensor drive unit 83, and a print control unit 84.

The AF unit 81 includes the photosensor 30 for detecting the lens barrel 24 at its initial position, and the DC motor 27 associated with a driver circuit 86 connected to the MC 80, which was previously mentioned. The AF unit 81 includes the ultrasonic autofocus controller (which will be hereinafter referred to as an AF controller) 85 interconnected between the ultrasonic generator 7 and the MC 80. The MC 80 receives a signal representing the subject distance measured by the AF controller 85 and a signal representing subject brightness from the photosensor 30 and controls the DC motor 27 as to the amount of rotation and the direction of rotation based on the received signals.

The image sensor unit 82 includes the potentiometers 48 and 60, the line sensor 63 and a driver 87 for driving the line sensor 63, all of which are connected to the MC 80. The MC 80 receives a signal from the potentiometer 48 to determine or specify the limits of movement of the line sensor 63 and a signal from the potentiometer 60 to make certain of the 2048 photoconversion elements effective for image reading. For example, if the upper portion of the surface of a standard writing board 100 is to be copied by the electronic copying machine 1, as shown by solid lines in FIG. 5, the lower consecutive 1600 photoconversion elements, the 1st to the 1600th, are made effective for specifically defining an image reading area of the writing board 100 in the vertical direction. On the other hand, if the lower portion of surface of the writing board 100 is to be copied by the electronic copying machine 1 as shown by chain lines in FIG. 5, the upper consecutive 1600 photo-detecting elements, from the 449th to the 1600th, are made effective for specifically defining an image reading area of the writing board 100.

The image sensor drive unit 83 includes the photosensor 66 and a driver 88 for driving the stepping motor 65. Both the photosensor 66 and the driver 88 are separately connected to the MC 80. The driver 88 receives pulses from the MC 80 to determine the number of stepwise rotations and the direction of rotation of the stepping motor 65, thereby controlling the movement of the line sensor 63 along the horizontal guide shafts 61 and 62. A signal from the photosensor 66 is used to verify that the line sensor 63 is in its starting or initial position.

The printing unit 84 includes the stepping motor 72 and the thermal printing head 73 connected to the MC 80 through drivers 89 and 90, respectively. The MC 80 causes the stepping motor 72 and the thermal printing head 73 to operate simultaneously with the driving of the line sensor 63 to read an image so as to form a thermal image on the thermosensitive copy paper 17. When the line sensor 63 terminates image reading, the thermal printing head 73 stops its operation. After a certain period of time from the stoppage of operation of the thermal printing head 73, the stepping motor 72 is stopped.

To make a hard copy of notes, illustrations or the like written on the writing board 100 itself or on a sheet placed on or tacked to the writing board 100, the electronic copying machine 1 of the present invention is put on a table or desk 101 in front of the writing board 100. The surface of the writing board 100 is viewed through the finder screen 10 for framing a desired area to be copied. After opening the access side door 16 and turning on the power switch, the copy width change lever 11 is slid to turn the swingable lever 43 via the pin 47, causing a sliding movement of the framing mask 40 in engagement with the pin 44 of the swingable lever 43 in a direction parallel to the optical axis P of the taking lens system 23 so that one of the stepped portions of the opening 41 of the framing mask 40 matches the width of the writing board 100. The moved position of the copy width change lever 11 is detected by the MC 80 from an output of the potentiometer 48.

The copy height adjusting knob 12 is then operated to turn the gears 56 and 57 so as to shift the framing mask 51 in a direction parallel to the optical axis of the taking lens 23. If the electronic copying machine 1, having previously been adjusted suitably for making a copy of the writing board 100 at a usual position of use as shown by solid lines in FIG. 5, needs to be readjusted suitably for making a copy of a lower portion of the writing board 100 as shown by dotted lines, the copy height adjusting knob 12 is operated so as to rotate the gear 57 in the counterclockwise direction and therefore the gear 56 in the clockwise direction, thereby shifting the framing mask 51 backward or toward the line sensor 63. The clockwise rotation of the gear 56 is followed by a clockwise sliding movement of the slide contact 58 along the resistance segment 59. This results in a decreased level of output from the potentiometer 60.

When the shutter release button 9 is depressed, the ultrasonic generator 7 directs ultrasonic waves toward the writing board 100 and receives the ultrasonic waves reflected by the surface of the writing board 100. The AF controller 85 of the AF unit 81 detects the subject distance of the writing board 100 based on the reflected ultrasonic waves and outputs a distance signal to the MC 80. The MC 80 actuates the driver 86 so as to start the clockwise rotation of the DC motor 27, thus rotating the lens barrel 24 to focus the taking lens system 23 on the writing board 100. At the beginning of rotation of the lens barrel 24 for focusing, the ring cam 31 forces the cam follower pin 33 sideways, turning the mirror drive lever 32 in the counterclockwise direction to swing up the mirror 34 associated with the rear end of the mirror drive lever 32 as well as to open the lens cover 6 associated with the front end of the mirror drive lever 32.

Upon the lens barrel 24 being turned and the lens system 23 being focused so as to form an image of the writing board 100 in a focal plane, the MC 80 stops the DC motor 27. Simultaneously, the stepping motor 65 starts rotating in the clockwise direction, thus shifting the line sensor 63 from the starting position to the left to scan the focal plane in which the image of the writing board 100 is formed.

While traveling in the focal plane, the line sensor 63 outputs image signals from the consecutive 1600 photoconversion elements designated and made effective by the MC 80 at intervals according to outputs from the potentiometer 48 and sends them to the MC 80. The MC 80 causes the driver 86 to drive the thermal printing head 73 according to the image signals. Simultaneously with driving the thermal printing head 73, the MC 80 causes also the driver 89 to drive the stepping motor 72, rotating the drive roller 71a so as to forward the thermosensitive copy paper 17 toward the paper slot 18. Thereby, the thermal printing head 73 prints an image of the writing board 100 on the thermosensitive copy paper 17 line by line.

Because the height of an area of the writing board 100 to be copied can be changed by operating the height adjusting knob 15 without tilting the electronic copying machine 1 by means of an adjuster, the electronic copying machine 1 is stable on the table and an image formed on the line sensor 63 is independent of vibrations of the stepping motors 65 and 72 and the drive roller 71, so that an image of the writing board can be copied without blurring.

At the end of reading an image of the writing board by the line sensor 63, the MC 80 causes the stepping motor 65 to rotate in the counterclockwise direction so as to shift back the line sensor 63 to the start position. The photosensor 66 detects the line sensor 63 at the start position and outputs a signal to the MC 80 to cause the driver 88 to stop the rotation of the stepping motor 65.

Simultaneously with the rotation of the stepping motor 65, the MC 80 causes the DC motor 27 to rotate in the counterclockwise direction, turning the lens barrel 24 in the counterclockwise direction toward the start position. During the counterclockwise movement of the lens barrel 24, the ring cam 31 releases the cam follower pin 33, allowing the lens cover 6 to close the taking lens system 23 by the spring 21. The closing movement of the lens cover 6 causes the mirror drive lever 32 to turn in the clockwise direction via the connecting shaft 20, thus causing the mirror 34 to swing down. The photosensor 30 detects the lens barrel 24 at the start position and outputs a signal to the MC 80 to cause the driver 86 to stop the rotation of the DC motor 27. After printing, MC 80 maintains the stepping motor 72 in rotation for a certain period of time. When the stepping motor 72 stops, the cutter 74 is actuated to cut off the printed part of the thermosensitive copy paper 17.

It is to be noted that the photoconversion elements of the line sensor 63 can be designated and made effective either before or after image reading.

Figure 6:
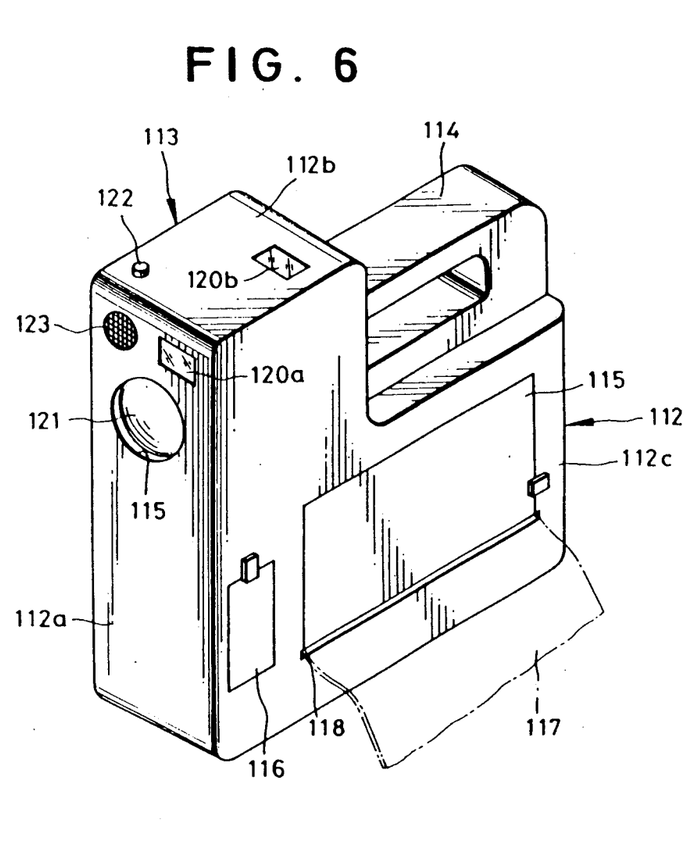
FIG. 6 is a perspective view showing an electronic copying machine according to another preferred embodiment of the present invention.
Figure 7:
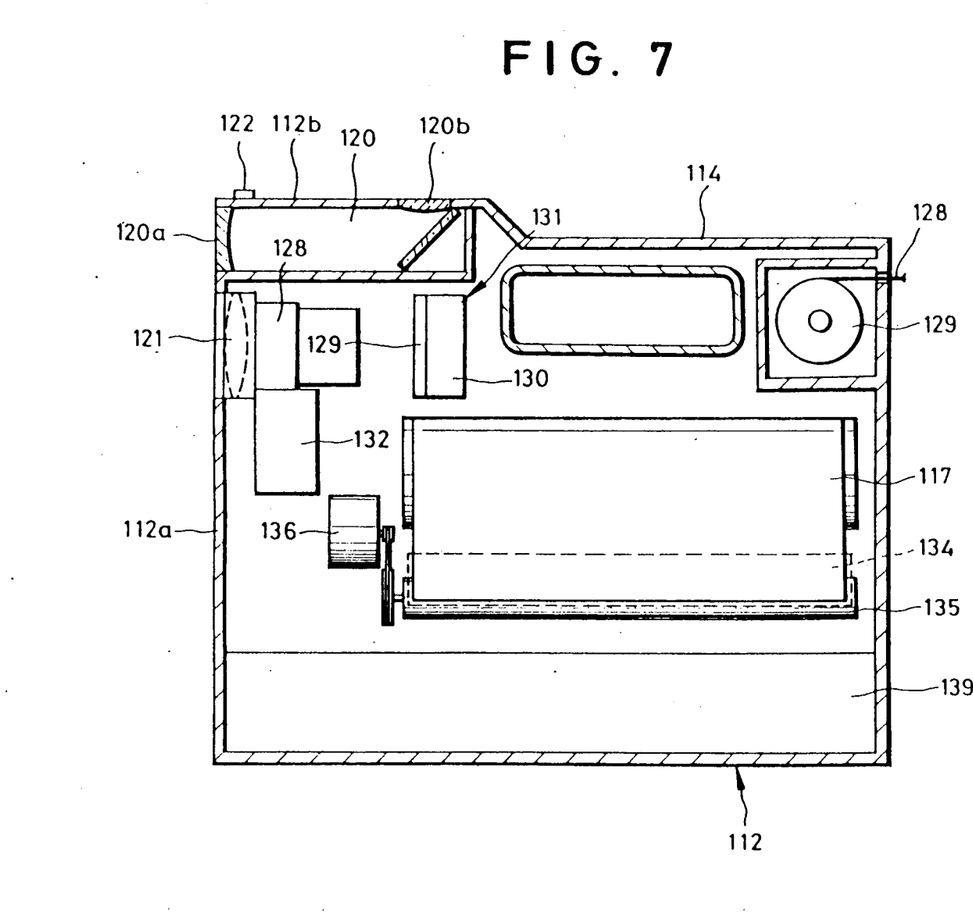
FIG. 7 is a side view showing the electronic copying machine shown in FIG. 6 with a side wall removed.
Figure 8:
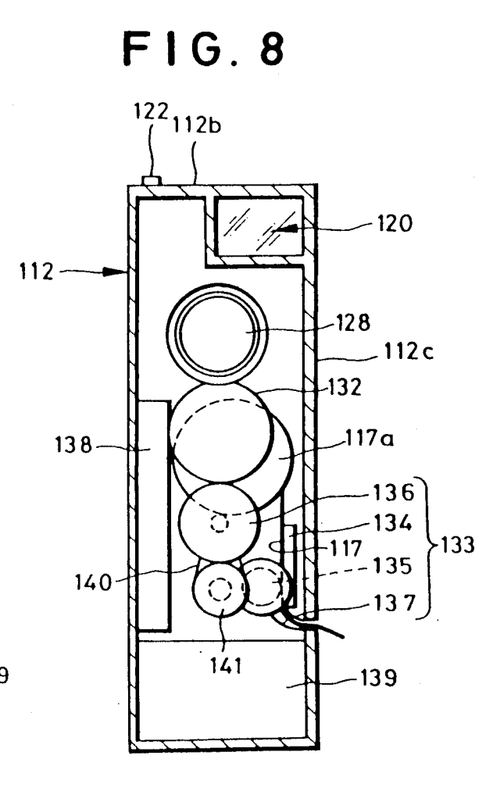
FIG. 8 is a front view showing the electronic copying machine shown in FIG. 6 with a front wall removed.

Referring to FIGS. 6 to 8, there is shown an electronic copying machine in accordance with another preferred embodiment of the present invention, which is capable of forming an image independently of vibrations transmitted from various moving elements and which is thin and compact in size. As shown, an electronic copying machine according to this other preferred embodiment of the present invention consists of a thin flat housing 112 with a rear upper quarter portion cut away. A handgrip 114 is formed in the cut-away portion for carrying convenience. A front upper quarter portion 113 of the housing 112 comprises an image-forming housing section.

The housing 112 has an exposure opening 115 formed in an upper portion of its front wall 112a. A taking lens 121 is mounted on the back of the front wall 112a in the housing 112. An ultrasonic generator 123 of an ultrasonic autofocus device is provided above the taking lens 121 in the housing 112. The ultrasonic generator 123 generates and directs ultrasonic waves toward a subject, such as a writing board 100 (see FIG. 5), remote therefrom at an angle of approximately 10° with respect to the optical axis of the taking lens system 121 and receives the ultrasonic waves reflected by the subject to measure the distance between the electronic copying machine 111 and the writing board 100, and outputs a distance signal representing the subject distance.

The front wall 112a of the housing 112 is provided with an object lens 120a of a finder system 120. The top wall 112b of the housing 112 is provided with a shutter release button 122 and an eyepiece 120b of the finder system 120. This finder system 120 is used to define an area of the writing board to be copied.

One side wall 112c of the housing 112 is provided with a paper loading door 115 hinged thereto along its left side and a small access door 116 hinged thereto along its bottom side. The paper loading door 115 is opened to load a roll of thermosensitive copy paper 117 as a recording paper in a printer unit located in the housing 112 adjacent to the paper loading door 115. The thermosensitive copy paper 117 can be withdrawn through a paper slot 118 formed in the side wall 112c along the lower side of the paper loading door 115. The small door 116 is opened for access to a control panel with various switches, such as a power switch, a print mode select switch, a density adjustment switch, etc., which are all well known in the art.

Details of the arrangement of the electronic copying machine of FIG. 6 are shown in FIGS. 7 and 8. Inside a rear portion of the handgrip 114, there is provided a reel 129 around which an extension cable 128 is wound. The finder system 120, which has an optical axis parallel to the optical axis of the taking lens system, is disposed in the upper section of the image-forming housing section 113 and extends from the front to the back of the image-forming housing section 113. An optical system unit 128 including the taking lens system 121 is disposed below the finder system 120 and forms an image of the writing board in an image plane. An image pick-up unit 131, which consists of a line sensor 129 and a motor 130, is disposed behind the optical system unit 128. The line sensor 129 is so disposed that the photosensitive surface thereof lies in the image plane in which the taking lens system 121 forms an image. The motor 130 drives the line sensor 129 in a horizontal direction perpendicular to the optical axis of the optical system unit 128 for scanning an image formed on the image plane and outputting video image signals.

An automatic focusing (AF) unit 132 including a taking lens drive motor is disposed below and cooperates with the optical system unit 128. The AF unit 132 drive the optical system unit 128, in particular the taking lens system 121, to adjust lens system 121 so as to focus on the subject according to the distance signal provided by the ultrasonic distance detecting unit 123. The drive mechanism for the taking lens system 121 is not shown but may comprise any well known mechanism.

In the middle of the housing 112 there is a thermal printing unit 133 for printing an image on the thermosensitive copy paper 117. The thermal printing unit 133 consists of a thermal printing head 134 driven according to the video image signals so as to form a thermal image on the thermosensitive paper 117 withdrawn from a paper roll 117a, a platen 135 for pressing the thermosensitive paper 117 against the thermal printing head 134 and transporting it downwardly, a motor 136 for driving the platen 135 at a constant speed through a belt 140 and a pulley 141. Between the platen 135 and the paper slot 118 formed in the side wall 112c of the housing 112 there is a pair of guide plates 137 for forming a guide passage through which the printed thermosensitive paper 117 is ejected.

A printed circuit board 138 including a central processing unit or a microcomputer for controlling the operation of the respective units is attached to the inner surface of a side wall opposite to the side wall 112c. In the bottom of the housing 112 there is a power regulating unit 139 including at least a power transformer, which is heavy in weight.

Because the heavy power regulating unit 139 is disposed in the bottom of the housing 112 and the center of gravity of the housing 112 is thus lowered, the electronic copying machine 111 is hard to knock over. This makes it possible to shape the housing 112 in the form of a generally rectangular thin box and to make the electronic copying machine compact.

Figure 5:
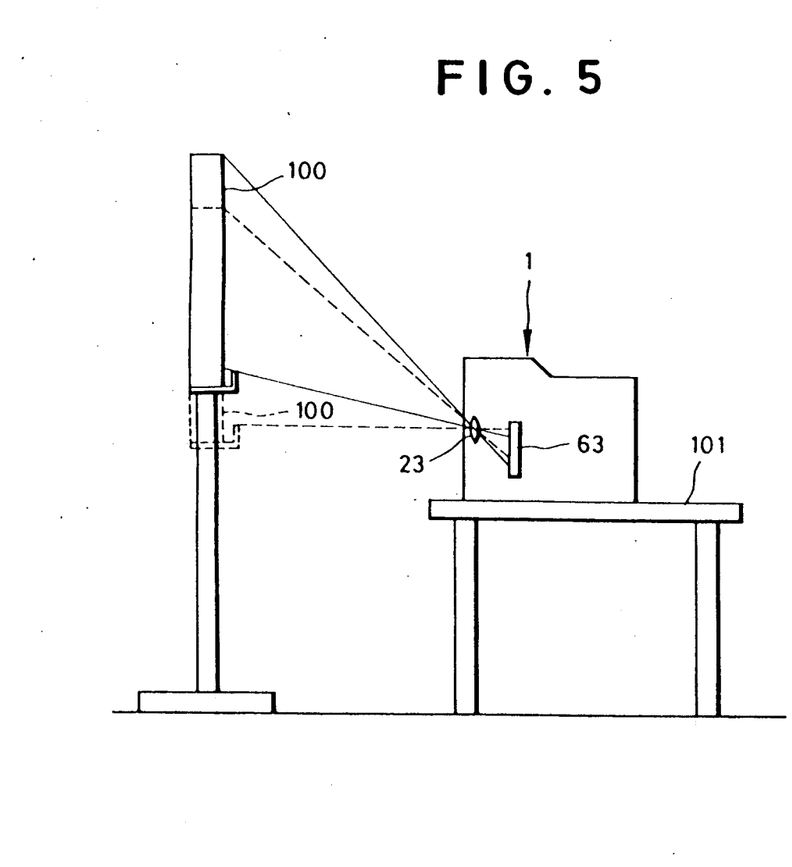
FIG. 5 is an illustration showing the electronic copying machine used to make a copy of a remote surface.

The electronic copying machine thus constructed according to FIGS. 6-8 is placed on a table in front of a writing board to be copied for making a copy of notes on the writing board, as shown in FIG. 5. To define an area of the writing board to be effectively copied while looking through the finder system 120, the electronic copying machine is moved back and forth and/or sideways on the table. When the electronic copy machine is disposed in a suitable position, the start button 122 is depressed to start copying. Initially, the ultrasonic distance detector 123 is actuated to detect or measure the distance of the writing board and outputs a distance signal representing the detected subject distance. According to the distance signal, the AF motor 132 rotates to focus the taking lens system 121 on the surface of the writing board. Immediately after the focusing, the motor 130 is actuated to drive the line sensor 129 in the transverse direction to scan the image formed on the image plane of the taking lens system 121. The line sensor 129 outputs video image signals and send them to the microcomputer included in the printed circuit board 138. Simultaneously with the scanning of the image by the line sensor 129, the microcomputer causes the motor 136 to drive the platen 135. Responsive to the video image signals output from the line sensor 129 the microcomputer causes the thermal printing head 134 to drive so as to print a thermal image on the thermosensitive copy paper 117 which is being transported by the platen 135. The thermosensitive copy paper 117 thus printed is slowly ejected through the paper slot 118.

Although the present invention has been fully described in connection with preferred embodiments thereof with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A portable electronic copying machine for making a hard copy of a surface remote from said machine, comprising:

a thin substantially parallelepipedal housing having a front-to-rear depth substantially greater than its side-to-side width;

image pick-up means disposed in an upper portion of said housing for forming an image of a remote surface and converting said image into image signals, said image pick-up means having an axis extending in a lengthwise direction from front to rear of said upper portion of said housing;

a power supply unit including at least a power transformer disposed in the bottom of said housing; and an image printing unit including a printing head disposed between said image pick-up means and said power supply unit, said printing head being driven according to said image signals to print an image of said remote surface on paper.

2. A portable electronic copying machine as defined in claim 1, wherein said image pick-up means comprises an image-forming optical system and a motor-driven image sensor movable in a transverse direction perpendicular to said axis to scan a plane in which said image-forming optical system forms an optical image of said remote surface.

3. A portable electronic copying machine as defined in claim 2, wherein said image printing unit includes a motor for transporting said paper in synchronism with said transverse movement of said sensor.

4. A portable electronic copying machine as defined in claim 1, further comprising a finder system disposed above said image pick-up means in said upper portion of said housing and including a substantially horizontal finder screen onto which a user looks down to see the field of view of the copying machine.

5. A portable electronic copying machine as defined in claim 1, said upper portion of said housing being disposed only at the front of said housing, a lower portion of said housing extending rearwardly of and below said upper portion of said housing, and handle means on top of said lower portion of said housing and disposed behind said upper portion of said housing.

6. A portable electronic copying machine as defined in claim 5, said handle means being secured both to said lower portion of said housing and to the rear of said upper portion of said housing.

7. A portable electronic copying machine for making a hard copy of a remote surface, comprising:
  a housing;
  image-forming optical means disposed in said housing for forming an optical image of a remote surface in an image plane;
  image sensor means disposed in said image plane and moving in said image plane for scanning said optical image to convert said optical image into image signals;
  scanning area defining means for selectively varying the vertical extent sensed by said image sensor so as to scan said optical image according to the height of said remote surface; and
  a printing unit including a printing head driven according to said image signals for printing an image of said remote surface on paper.

8. A portable electronic copying machine as defined in claim 7, wherein said scanning area defining means comprises a finder optical system, field of view defining means disposed in said finder optical system for variably defining the field of view of said finder system according to the height of said remote surface, and field of view detecting means for detecting said field of view defined by said field of view defining means and actuating said image sensor according to said detected field of view.

9. A portable electronic copying machine as defined in claim 7, wherein said image sensor means comprises a line sensor having a plurality of photo-detecting elements which are arranged in a vertical line and selectively actuated.

10. A portable electronic copying machine as defined in claim 8, wherein said field of view defining means comprises a fixed masking frame having openings which are arranged in a direction corresponding to the vertical direction of said remote surface and are equal in height to one another but differ in width from one another, and a movable masking frame having an opening having a height equal to those of said openings of said fixed masking frame and a width equal to the maximum width of said openings of said fixed masking frame, said movable masking frame being shiftable to selectively define a field of view of said finder optical system between said opening of said movable masking frame and any one of said openings of said fixed masking frame according to the height of said remote surface.

11. A portable electronic copying machine as defined in claim 10, wherein said field of view detecting means includes a potentiometer cooperating with said movable masking frame.

* * * * *